United States Patent
Rork et al.

(10) Patent No.: US 9,805,599 B2
(45) Date of Patent: Oct. 31, 2017

(54) METHOD AND APPARATUS FOR VEHICLE MESSAGE RECALL

(71) Applicant: FORD GLOBAL TECHNOLOGIES, LLC, Dearborn, MI (US)

(72) Inventors: Joseph Paul Rork, Plymouth, MI (US); Brian Petersen, Beverly Hills, MI (US); Praveen Yalavarty, Novi, MI (US); Ritesh Pandya, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 395 days.

(21) Appl. No.: 14/260,535

(22) Filed: Apr. 24, 2014

(65) Prior Publication Data

US 2015/0310741 A1 Oct. 29, 2015

(51) Int. Cl.
  *G08G 1/0965* (2006.01)
  *H04M 1/66* (2006.01)
  *G06F 15/16* (2006.01)
  *H04W 4/12* (2009.01)
  *H04L 12/58* (2006.01)

(52) U.S. Cl.
  CPC .......... *G08G 1/0965* (2013.01); *H04L 51/26* (2013.01); *H04W 4/12* (2013.01); *H04L 51/04* (2013.01)

(58) Field of Classification Search
  CPC .................................................. G08G 1/0965
  See application file for complete search history.

(56) References Cited

U.S. PATENT DOCUMENTS

| | | | |
|---|---|---|---|
| 5,058,150 A | 10/1991 | Kang | |
| 6,498,976 B1 | 12/2002 | Ehlbeck et al. | |
| 7,420,954 B2 * | 9/2008 | Elbatt | H04W 4/00 370/254 |
| 2003/0083079 A1 * | 5/2003 | Clark | G08G 1/096716 455/466 |
| 2005/0144246 A1 * | 6/2005 | Malik | G06Q 10/107 709/206 |
| 2007/0262853 A1 * | 11/2007 | Bradus | B60R 25/1004 340/426.25 |
| 2008/0168122 A1 * | 7/2008 | Fletcher | G06F 17/3089 709/201 |
| 2008/0268895 A1 * | 10/2008 | Foxenland | G01C 21/20 455/550.1 |
| 2008/0287092 A1 | 11/2008 | Rindsberg et al. | |
| 2009/0047929 A1 * | 2/2009 | Chesnutt | H04L 51/38 455/411 |
| 2011/0044172 A1 * | 2/2011 | Yim | H04L 47/14 370/236 |
| 2013/0200991 A1 | 8/2013 | Ricci et al. | |

(Continued)

*Primary Examiner* — Joseph Feild
*Assistant Examiner* — John Mortell
(74) *Attorney, Agent, or Firm* — Jennifer Stec; Brooks Kushman P.C.

(57) ABSTRACT

A system includes a processor configured to receive a request for publication of a message to a vehicle. The processor is further configured to determine if the message has a time-sensitive indicia, defining an expiration time, affiliated therewith. Also, the processor is configured to deliver messages having time-sensitive indicia to a time-sensitive inbox. The processor is additionally configured to remove messages from the time sensitive inbox when a defined expiration time for a given message has passed.

20 Claims, 3 Drawing Sheets

(56) References Cited

U.S. PATENT DOCUMENTS

2013/0253777 A1* 9/2013 Tengler ................ G01C 21/26
                                                            701/45
2014/0342668 A1* 11/2014 Kyomitsu .......... G07C 9/00944
                                                            455/41.2
2015/0254719 A1* 9/2015 Barfield, Jr. ....... G06Q 30/0265
                                                            705/14.53

* cited by examiner

METHOD AND APPARATUS FOR VEHICLE MESSAGE RECALL

TECHNICAL FIELD

The illustrative embodiments generally relate to a method and apparatus for recalling time sensitive messages sent for vehicle processing.

BACKGROUND

With the advent of vehicle telematics systems, remote communication with a vehicle is now possible. Original equipment manufacturers (OEMs) and other technology partners may be provided with the options to send messages or commands to a vehicle for processing. Since vehicles may move in and out of communication (traveling through tunnels, for example) with a remote source, messages may not always reach a vehicle soon after being sent.

Typically, the problem of a message not reaching a vehicle almost immediately is not one of great concern. Many vehicle messages can simply reach the vehicle when the vehicle is available, and be handled in accordance with the instructions contain within the messages. In some instances, however, messages may be time sensitive. In these cases, undesirable results may occur if a message reaches a vehicle far later than the message was sent. For example, without limitation, if an unlock command was sent from a remote source, and the message didn't reach the vehicle until two hours later, the vehicle may be accidentally remotely unlocked at an undesirable time.

U.S. Application Publication No. 2013/0200991 generally relates to a microprocessor executable network controller operable to cache media intended for a vehicle occupant in response to a vehicle state change, vehicle function, change in vehicle location, actual or expected change in a signal parameter associated with a selected channel and/or request by the vehicle occupant and/or a signal source.

SUMMARY

In a first illustrative embodiment, a system includes a processor configured to receive a request for publication of a message to a vehicle. The processor is further configured to determine if the message has a time-sensitive indicia, defining an expiration time, affiliated therewith. Also, the processor is configured to deliver messages having time-sensitive indicia to a time-sensitive inbox. The processor is additionally configured to remove messages from the time sensitive inbox when a defined expiration time for a given message has passed.

In a second illustrative embodiment, a system includes a processor configured to determine a connection state change with respect to a vehicle connection to a message server. The processor is also configured to broadcast the connection state change to approved entities having a predefined interest in connection state change notification. Further, the processor is configured to examine one or more time sensitive messages upon connection state change and remove expired time sensitive messages when examination reveals that an expiration time has passed.

In a third illustrative embodiment, a computer implemented method includes receiving a request for publication of a message to a vehicle. The method also includes determining, via a receiving computer, if the message has a time-sensitive indicia, defining an expiration time, affiliated therewith. Further, the method includes delivering messages having time-sensitive indicia to a time-sensitive inbox and removing messages from the time sensitive inbox when a defined expiration time for a given message has passed.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
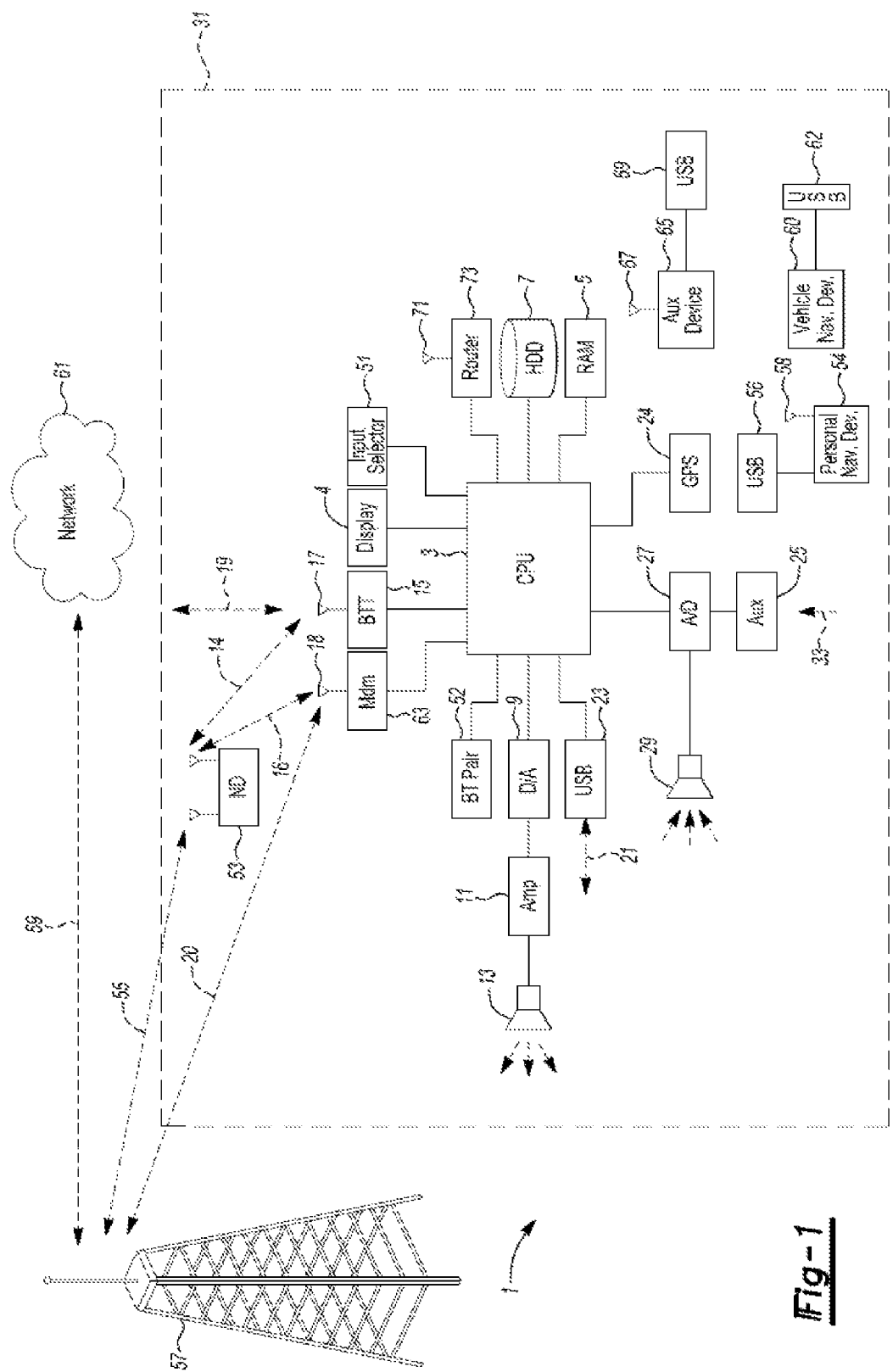
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a universal serial bus (USB) input 23, a global positioning system (GPS) input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a controller area network (CAN) bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as personal navigation device (PND) 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, personal digital assistant (PDA), or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the central processing unit (CPU) is instructed that the onboard BLUETOOTH transceiver will be paired with a BLUETOOTH transceiver in a nomadic device.

Data may be communicated between CPU 3 and network 61 utilizing, for example, a data-plan, data over voice, or dual-tone multi-frequency (DTMF) tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as infrared data association (IrDA)) and non-standardized consumer infrared (IR) protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 nibs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

Figure 2:
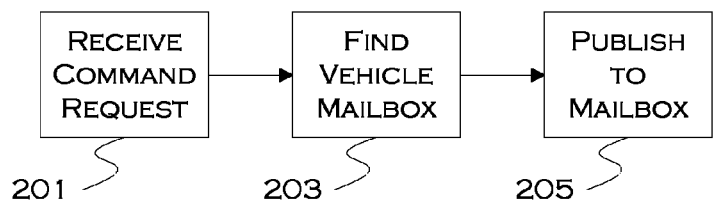
FIG. 2 shows an illustrative example of a command publication process according to the prior art.

FIG. 2 shows an illustrative example of a command publication process according to the prior art. In this simplified model, vehicles and systems desiring to communicate with vehicles will operate under a publish/subscribe model. For example, the system sending the message to a vehicle or vehicles will publish the message with some identifying criteria to a mail-server 201. The criteria will be used to determine which, if any, vehicles, will subscribe to that message (based on, for example, settings associated with each vehicle on the message server) 203. The message will then be delivered to the "inbox" of each vehicle 205. Vehicles can then retrieve their particular messages from the inbox. If the vehicle is in current communication with the message server, then it is possible for the message to be retrieved immediately once it is published to the vehicle inbox.

Problems arise when the message is time sensitive, and the vehicle is not currently connected to the server. If the lapse in connection was only brief, the vehicle may soon reconnect with the server and be able to retrieve messages and execute any pertinent commands associated therewith. If the lapse in connection is prolonged, however, and the message includes a command intended for immediate or near-immediate execution, the message may simply persist in the inbox until such time as the message is retrieved. Then, when connection is re-established at a later time, the message may be retrieved and the command may be executed. But, since the command was intended to be executed when the message was sent, execution of the command at the later point may result in undesirable consequences. For example, without limitation, the command may unlock the vehicle when the vehicle was not intended to be unlocked.

An exemplary, non-limiting list of commands that may be time sensitive include, but are not limited to, lock, unlock, remote start, cancel remote start, trigger alarm, trigger chirp, in-vehicle authorization requests, time-sensitive coupons, instant message style communication with the vehicle display/vehicle.

In the illustrative embodiments, communication is provided between the vehicle and the message server so that the vehicle identifies when it is connected (and this can be provided to relevant publishing entities) and the vehicle identifies when it gracefully disconnects. In the event of an unexpected disconnection, a separate mailbox for time sensitive publications can persist, and these publications can be recalled if and when their expiration passes, and the vehicle has not yet connected and processed the messages. In this manner, many problems with late execution/receipt of time sensitive information can be avoided.

Figure 3:
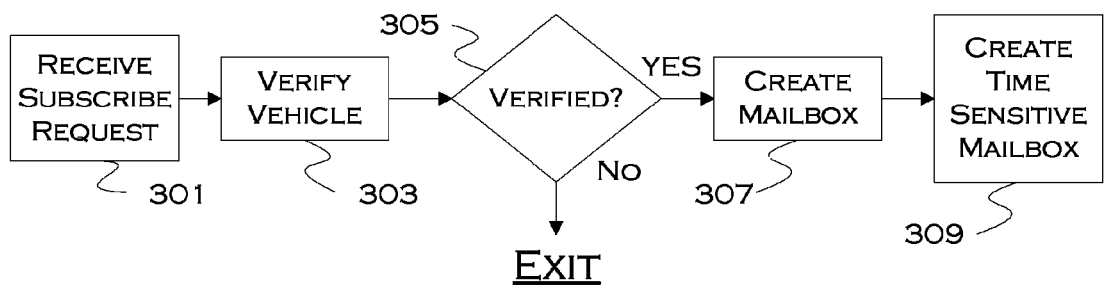
FIG. 3 shows an illustrative example of a subscription process.

FIG. 3 shows an illustrative example of a subscription process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, a vehicle registers with a message server to receive messages. The vehicle may also be, for example, updating a subscription request to a new publisher. The remote server receives the subscription request from the vehicle 301 and verifies that the vehicle is permitted to subscribe/register/update the requested service 303. If the vehicle is not verified 305, the process exits.

If the permissions are verified 305, the process will create a mailbox for the vehicle 307. In another illustrative example, the process will edit a mailbox for a vehicle, to include a new subscription. Depending on the model chosen, a vehicle may have a single mailbox for all subscriptions, or a mailbox corresponding to each or groups of subscriptions. Creation and updating of mailboxes can be performed as needed.

Also, in this example, a time sensitive mailbox may be created for a particular publisher and/or for general mail to a vehicle. This mailbox can contain messages that have time sensitive indicia, and that may need to be recalled if a given time period passes.

Figure 4:
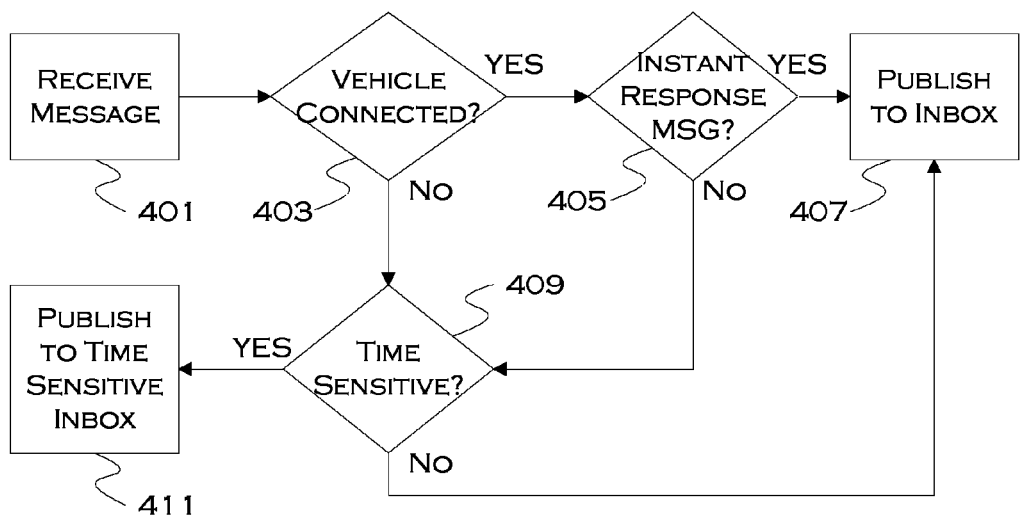
FIG. 4 shows an illustrative example of a message publication process.

FIG. 4 shows an illustrative example of a message publication process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process may receive a message from an OEM or a technology partner approved for communication with a particular vehicle 401. The message will also likely have some identifier associated therewith, identifying either a publisher (so that subscribers can be identified) or a particular vehicle or vehicles to which the message is to be sent.

In this example, the message identifies a particular vehicle to which the message is to be sent. The process first determines if the particular vehicle is connected or not 403. If the vehicle is connected, then the message will likely be instantly received and processed. The process also checks to see if the message is of a type that can receive an instant response from the vehicle 405. Such messages include, but are not limited to, lock/unlock, start/terminate start, etc. If the message is an "instant response" type message, the message is published to an appropriate inbox for the vehicle and/or publisher 407.

If the message is not an instant response type message, and/or the vehicle is not currently connected to the message server, the process will check to see if the message is a time sensitive message 409. In this example, even if the message is an instant response type message, it may have some acceptable delay associated therewith and be marked as time-sensitive. Or, for example, the message may be a time sensitive advertisement that is only good for a given period of time.

If the message is time sensitive, the process will publish the message to a designated time sensitive inbox 411. Otherwise, the message will be published to a general inbox, for receipt and processing at an appropriate time once the vehicle later connects.

Some examples are now provided showing illustrative functionality based on message types received.

In the examples below, an unlock message, a system update message and a coupon are all sent to a vehicle. The unlock message is an instant response type message, having an expiration of five minutes. The system update message is a general message having no expiration, relating to an update of a vehicle software module. The coupon is an offer for a discounted oil change, having a forty minute expiration.

When the Vehicle is Connected

If the vehicle is connected to the message server when each of the above messages is received, the messages will be handled in the following manner (in this example).

The unlock message will be received and it will be noted that the vehicle is connected. Accordingly, the process assumes that the vehicle will receive the message once the message is published to the inbox (either the time sensitive inbox or the general inbox). In this case, the message is an instant response message, so the message is published to the general inbox where it is received and executed by the connected vehicle. It is also possible that the message would be published to the time sensitive inbox, and simply removed once the vehicle receives the message. Such a solution might account for the plausible scenario where the vehicle drops connection between the "connected" check and the publication of the message.

Figure 5:
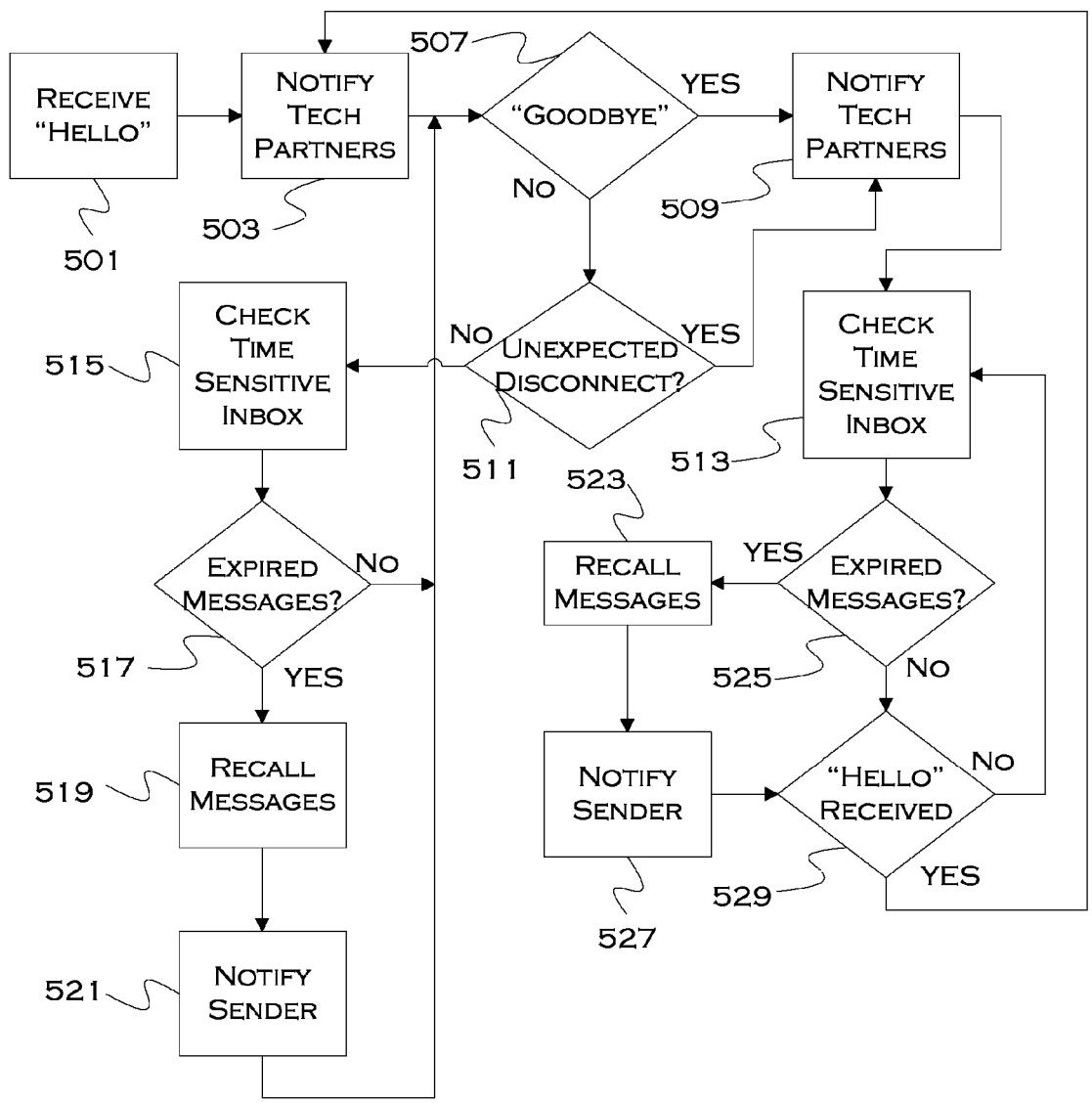
FIG. 5 shows an illustrative connect/disconnect process for a system including recall capability.

In FIG. 5, it will be shown that, in some examples, publishers are notified of a vehicle connection status. This can help determine whether or not to publish a particular message. While this can serve as one connection check, the system may make the further connection check described in FIG. 4 if desired, if a message is to be routed based on whether or not the vehicle is presently connected.

Note, some time-sensitive messages may still be sent even if the vehicle is not connected. For example, even an unlock message may be sent if a vehicle is not connected, under the assumption that the vehicle may connect within the prescribed expiration time. Similarly, a time sensitive coupon message may be sent, regardless of current connection status. Alternatively, a time sensitive instant message may not be sent, since it may be intended for immediate delivery upon sending, if the vehicle is not connected.

The system update message will also be received, and, since the vehicle is connected and the message is not an instant response type message, the process will check to see if the update message is a general time sensitive message. Since the message is not time sensitive, the system update message will be published to the general inbox. Here, although the vehicle is connected, it may not process the update immediately, since this may require the vehicle to be in park, for example, but the system will get to the message at an appropriate time, and, since the message is not time sensitive, the message will persist until such time.

Finally, the coupon will also be received. In this example, the vehicle is connected and the coupon is not an instant-response type message, so the process will check to see if the coupon is time sensitive. Since the coupon is time sensitive, the process will place the coupon in an appropriate time sensitive inbox. Addressing expired items in the time sensitive inbox will be discussed further with respect to FIG. 5.

When the Vehicle is not Connected

If the vehicle is not connected to the message server, handling of the various messages may vary depending on the type of message.

The unlock message will be received and the process will determine that the vehicle is not connected to the server. In this case, in the illustrative exemplary process, the system will determine that the unlock message is a time sensitive message, and will place the message in the appropriate time sensitive inbox. Since the message only has, in this example, a five minute expiration, it will not persist long in the time sensitive inbox before being recalled.

The system update message will be received and will be recognized as non-time sensitive. Accordingly, the message will be place in an appropriate general inbox. The coupon message will be received and recognized as time sensitive, and will be placed in a time sensitive inbox, accordingly.

In some examples, the step of checking to see if the vehicle is connected will be skipped, and the messages will simply be placed into an inbox according to their type. In such a case, this process would place the unlock and coupon in a time sensitive inbox (regardless of vehicle connection status) and place the system update into a general inbox. The particulars of the placement process can be determined on a case-by-case basis, as is appropriate for placing messages in the particular boxes according to the desired configuration of a message handling system.

FIG. 5 shows an illustrative connect/disconnect process for a system including recall capability. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process receives a "hello" notification from a connected system 501.

By providing a "hello" or similar notification to all interested publishers when a vehicle system connects, and by providing a "goodbye" when the system gracefully disconnects, the publishers do not need to query the system each time before sending a message to see if the system is online. The publishers will know that a given system is online, and they can act accordingly.

The connecting vehicle system may have a number of subscriptions and/or publishers affiliated therewith. Other parties, such as OEMs, may want to know the connection state of every vehicle. In this example, when the "hello" is received, signifying system connection, the process can notify the appropriate parties that the vehicle system is connected 503.

While the system is connected, messages can be published to the appropriate inboxes based on a connected system, such as shown with respect to FIG. 4, for example. During this time, the process monitors for a "goodbye" from the vehicle system 505, signifying a graceful disconnect.

If a graceful disconnect occurs, the process will notify technology partners, publishers and any other entities rightfully interested in the vehicle connection status 507. Since the vehicle is now disconnected, however, the process will also handle messages remaining in the time sensitive inbox.

For example, if there were a coupon message in the time sensitive inbox and the vehicle gracefully disconnected, the message may expire before the vehicle reconnects. Since the coupon would no longer be intended to be valid, the process would need to remove the coupon from the inbox prior to the vehicle system attempting to process the message and use the coupon.

Once the vehicle has gracefully disconnected, in this example, the process checks the time sensitive inbox 515. In another example, messages themselves could have a time sensitive designation, and could simply reside in a main inbox, the designation providing the impetus for the system to check the particular messages.

If any of the messages have expired without being utilized/processed/received/etc. by the vehicle 525, the system will recall these messages 523. Since the sender may wish to know that a message was recalled, the process may also notify the sender 527. While the process loops through checking the time sensitive inbox, the process also checks to see if a "hello" is received 529, signifying that a vehicle has reconnected to the system.

In this example, the process continues to loop through the inbox until no messages remain. If new messages are placed in the inbox while the vehicle remains disconnected, the process may also handle those messages as they expire.

In at least one example, the process can eliminate messages from the time sensitive inbox in a different manner. When a vehicle connects to the remote system (e.g., a hello or other connection indicia is received), the process can check the time sensitive inbox for all expired messages. Any expired messages can be recalled (e.g., removed, deleted, returned, etc.) prior to providing access to the inbox to the connecting system. In this manner, a connected system is not provided access to any expired messages, since the messages are removed before the vehicle is provided access to the inbox. Any appropriate system has advantages and disadvantages, and the particulars of the implementation may be left up to individual developers.

There is also the possibility that a system does not gracefully disconnect, but rather that the connection is dropped. If there is an unexpected disconnection, the message server recognizes this 511 and notifies the appropriate parties. Action is then taken, in this example, as if the graceful disconnection had occurred. In some examples, a timeout period for reconnection may be provided, and it may even be possible to temporarily extend the life of time sensitive messages for the timeout period in the event of an unexpected disconnection.

If there is no disconnection, the process will still handle messages that are time sensitive and that may expire. In this example, the process will check the time sensitive inbox or time sensitive messages 515. If any messages are expired 517, the process will recall the messages 519. Although not shown, the process may communicate to the vehicle that the message (e.g., a coupon) is about to expire, so as to provide a last opportunity for the vehicle to utilize the message.

Once the message is recalled, the message publisher will be notified 521 and the process will spool, waiting for a disconnect or for other messages to expire.

With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
receive a request for publication of a message to a vehicle;
determine if the message has a time-sensitive indicia, defining an expiration time, affiliated therewith;
deliver the message to a time-sensitive inbox, responsive to determining the message includes the time-sensitive indicia;
examine messages in the time-sensitive inbox upon connection state change; and
remove messages from the time-sensitive inbox when examination reveals that the expiration time affiliated with a given message has passed.

2. The system of claim 1, wherein the time-sensitive indicia is indicated by a message type, and is predefined and assigned for a given message type when the message is received.

3. The system of claim 2, wherein the message type is a lock state change.

4. The system of claim 2, wherein the message type is an ignition state change.

5. The system of claim 2, wherein the message type is an alarm state change.

6. The system of claim 2, wherein the message type is a chirp request.

7. The system of claim 1, wherein the time-sensitive indicia is included with the message.

8. A system comprising:
a processor configured to:
determine a connection state change with respect to a vehicle connection to a message server;
broadcast the connection state change to approved entities having a predefined interest in connection state change notification;
examine one or more time sensitive messages responsive to connection state change; and
remove expired time sensitive messages when examination reveals that an expiration time has passed.

9. The system of claim 8, wherein the processor is further configured to notify a sending party if a message is removed.

10. The system of claim 8, wherein the connection state change is a change from a connected to a disconnected state, and wherein the processor is configured to continuously examine time sensitive messages until the connection state changes back to a connected state.

11. The system of claim 8, wherein the connection state change is a change from a connected to a disconnected state, and wherein the processor is configured to periodically examine time sensitive messages at predetermined intervals until the connection state changes back to a connected state.

12. The system of claim 8, wherein the connection state change is a change from a disconnected state to a connected state, and wherein the processor is configured to examine all time sensitive messages before providing a connected vehicle access to the time sensitive messages.

13. The system of claim 8, wherein time sensitive messages include lock state change messages.

14. The system of claim 8, wherein time sensitive messages include ignition state change messages.

15. The system of claim 8, wherein time sensitive messages include alarm state change messages.

16. The system of claim 8, wherein time sensitive messages include chirp request messages.

17. The system of claim 8, wherein time sensitive messages include temporary coupons.

18. A computer implemented method comprising:
receiving a request for publication of a message to a vehicle;
determining, via a receiving computer, if the message includes a time-sensitive indicia, defining an expiration time, affiliated therewith;
delivering a message to a time-sensitive inbox, responsive to determining the message includes time-sensitive indicia;
examining messages in the time-sensitive inbox upon connection state change; and
removing messages from the time-sensitive inbox when examination reveals that the expiration time affiliated with a given message has passed.

19. The method of claim 18, wherein the time-sensitive indicia is indicated by a message type, and is predefined and assigned for a given message type when the message is received.

20. The method of claim 18, wherein the time-sensitive indicia is included with the message.

* * * * *